US009059881B2

(12) United States Patent
Mansour et al.

(10) Patent No.: US 9,059,881 B2
(45) Date of Patent: Jun. 16, 2015

(54) HEXAGONAL CONSTELLATIONS AND DECODING SAME IN DIGITAL COMMUNICATION SYSTEMS

(71) Applicant: Texas Instruments Incorporated, Dallas, TX (US)

(72) Inventors: Mohamed Farouk Mansour, Richardson, TX (US); Lars Jorgensen, Royal Oaks, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/051,194

(22) Filed: Oct. 10, 2013

(65) Prior Publication Data

US 2014/0177740 A1 Jun. 26, 2014

Related U.S. Application Data

(60) Provisional application No. 61/712,077, filed on Oct. 10, 2012.

(51) Int. Cl.
*H04L 27/30* (2006.01)
*H04L 25/06* (2006.01)
*H04L 27/34* (2006.01)
*H04L 27/38* (2006.01)

(52) U.S. Cl.
CPC .......... *H04L 25/067* (2013.01); *H04L 27/3411* (2013.01); *H04L 27/38* (2013.01)

(58) Field of Classification Search
CPC ...................................................... H04L 27/30
USPC .......................................................... 375/340
See application file for complete search history.

(56) References Cited

U.S. PATENT DOCUMENTS

| 5,233,629 | A | * | 8/1993 | Paik et al. | 375/262 |
| 5,742,643 | A | * | 4/1998 | Reeves et al. | 375/243 |
| 5,914,959 | A | * | 6/1999 | Marchetto et al. | 370/468 |
| 6,088,389 | A | * | 7/2000 | Larsson | 375/231 |
| 6,683,915 | B1 | * | 1/2004 | Trott et al. | 375/262 |
| 8,787,477 | B2 | * | 7/2014 | Mansour et al. | 375/262 |

(Continued)

OTHER PUBLICATIONS

J. R. Barry et al., "Signal-Space Coding," Digital Communication, Kluwer Academic Publishers 2004.*
J. R. Barry et al., "Signal-Space Coding," Digital Communication, Kluwer Academic Publishers 2004—Internet Citation at http://www.springer.com.*

(Continued)

*Primary Examiner* — Daniel Washburn
*Assistant Examiner* — Berhanu Tadese
(74) *Attorney, Agent, or Firm* — Steven A. Shaw; Frank D. Cimino

(57) ABSTRACT

Embodiments of the invention provide a method of decoding of hexagonal constellations. The decoding methods exploit the inherent structure of the hexagonal grid to eliminate/minimize the requirements for distance computations. A constellation which has unused constellation points is received. A plurality of lookup tables is used for indicating whether a particular constellation point is used. The lookup tables are indexed using the two integers u and v. An initial estimate $\bar{u}$ and $\bar{v}$ is found. The Euclidean distance to the immediate neighbors resulting in the immediate upper and lower integers for $\bar{u}$ and $\bar{v}$ is computed. From the distance to the nearest neighbor, the log-likelihood ratio value is computed.

18 Claims, 4 Drawing Sheets

(56) References Cited

U.S. PATENT DOCUMENTS

| | | | |
|---|---|---|---|
| 2001/0028630 A1* | 10/2001 | Burshtein et al. | 370/207 |
| 2004/0005011 A1* | 1/2004 | Trott et al. | 375/262 |
| 2004/0209570 A1* | 10/2004 | Fiore | 455/62 |
| 2005/0123061 A1* | 6/2005 | Smith et al. | 375/261 |
| 2008/0137763 A1* | 6/2008 | Waters et al. | 375/260 |
| 2008/0311918 A1* | 12/2008 | Spencer | 455/446 |
| 2012/0257896 A1* | 10/2012 | Djordjevic et al. | 398/65 |
| 2012/0263251 A1* | 10/2012 | Djordjevic et al. | 375/261 |

OTHER PUBLICATIONS

Alhabsi, Amer H. "Spectrally Efficient Modulation and Turbo Coding for Communication Systems," Nov. 2005.*

Tanahashi, M. et al., "A Multilevel Coded Modulation Approach for Hexagonal Signal Constellation," Wireless Communications, IEEE Transactions on, vol. 8, No. 10, pp. 4993,4997, Oct. 2009.*

Han, Seung H. et al., "On the Use of Hexagonal Constellation for Peak-To-Average Power Ratio Reduction of an OFDM Signal", IEEE Transactions on, vol. 7, No. 03, Mar. 2008.*

* cited by examiner

HEXAGONAL CONSTELLATIONS AND DECODING SAME IN DIGITAL COMMUNICATION SYSTEMS

CROSS-REFERENCE TO RELATED APPLICATIONS

This application claims priority to U.S. Provisional Application 61/712,077 filed Oct. 10, 2012. Said application incorporated herein by reference

STATEMENT REGARDING FEDERALLY SPONSORED RESEARCH OR DEVELOPMENT

Not applicable.

BACKGROUND

Embodiments of the invention are directed, in general, to communication systems and, more specifically, decoding hexagonal constellations.

BRIEF DESCRIPTION OF THE SEVERAL VIEWS OF THE DRAWING

FIG. 1 is a diagram of an example of codeword assignment for constellation order 32-HEX.

DETAILED DESCRIPTION

Figure 2A:
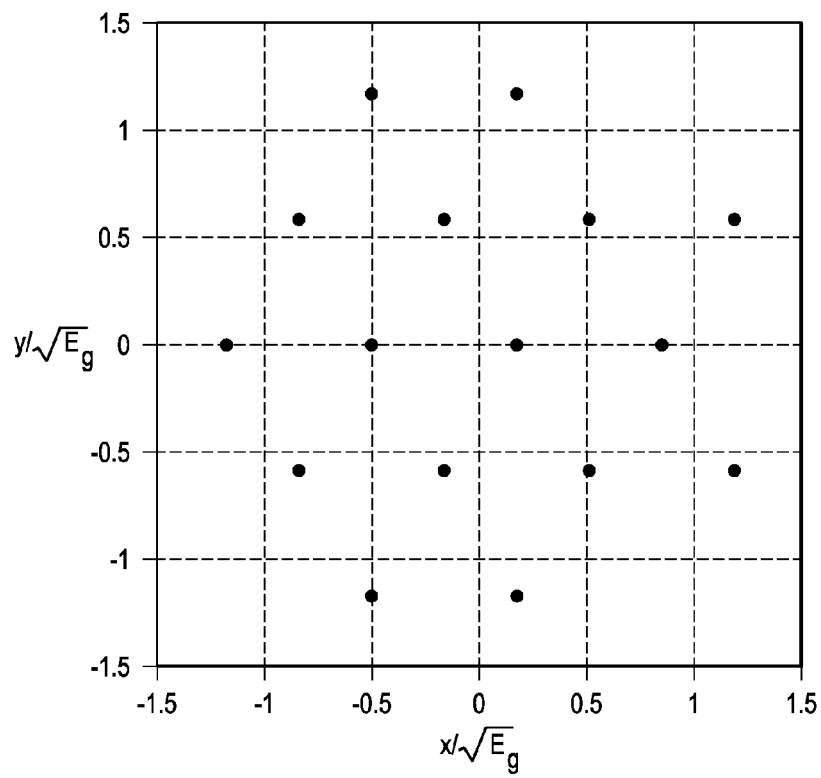
FIG. 2A is a diagram showing 16-HEX constellation.
Figure 2B:
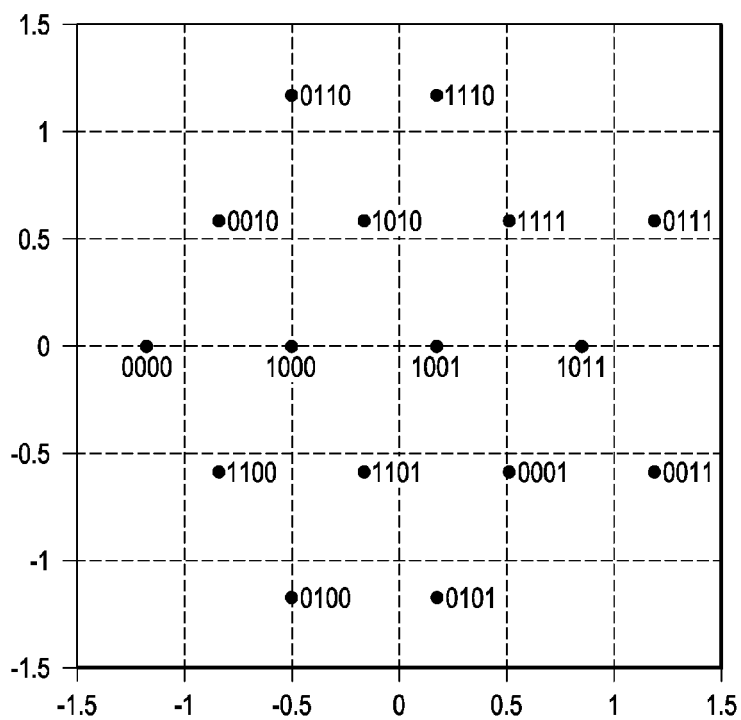
FIG. 2B is a diagram of an example of codeword assignment for constellation order 16-HEX as shown in FIG. 2A.
Figure 3:
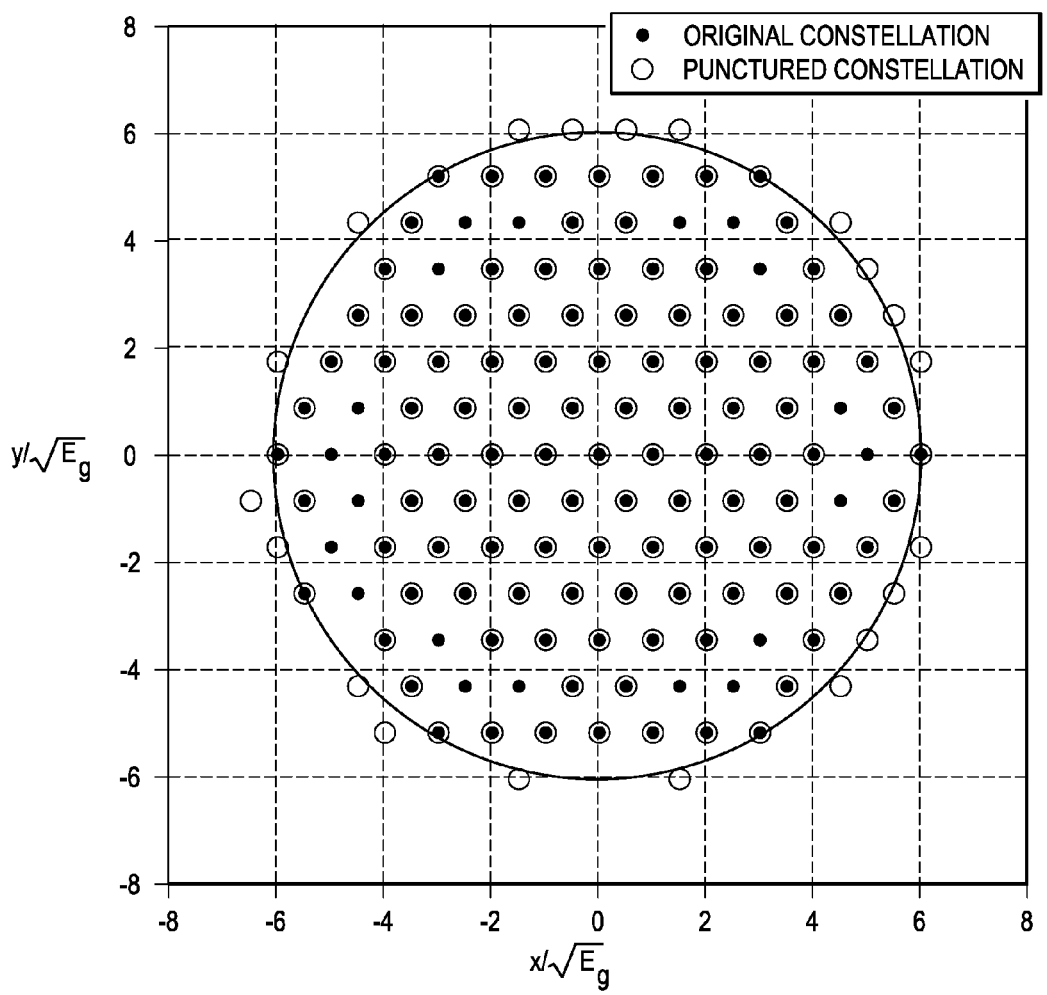
FIG. 3 is a diagram showing original and punctured 128-HEX constellations with 20 punctured constellation points.

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The decoding of hexagonal constellations is done over the two-dimensional grids (rather than two distinct 1-D decoding QAM constellations). The hexagonal constellation points are in general parameterized by two integers u and v, and the (x,y) coordinate of the i-th constellation point could be expressed as:

$$(x_i, y_i) = \sqrt{E_g}\left((x_0, y_0) + u_i(1,0) + \frac{v_0}{2}(1,\sqrt{3})\right)$$

where $(x_0, y_0)$ is a fixed perturbation that could be used to minimize the maximum energy.

Unlike regular QAM constellations where all constellation points within a given span are occupied, the hexagonal constellation has constellation points. This necessitates the use of a lookup table for decoding to indicate whether a particular constellation point is used, and store the corresponding codeword of the used constellation points. To simplify the decoding process, the indexing in the lookup tables uses the two integers u and v.

The structure of the hexagonal constellation provides a straightforward procedure for finding the nearest neighbor. If the normalized received symbol $$\frac{r}{\sqrt{E_g}} = (x, y),$$

then the initial estimate of u and v could be computed as:

$$\bar{u} = 2(y - y_0)/\sqrt{3}$$
$$\bar{v} = x - x_0 - (y - y_0)/\sqrt{3}$$

which are in general non-integer. To get the nearest neighbor we compute the Euclidean distance to the immediate neighbors, which correspond to the integer approximations of $\bar{u}, \bar{v}$, and pick the one that corresponds to the smallest distance (provided it is used in the constellation).

Note that, computing the distances to the all neighbors could be implemented such that no multiplication is required. For example, let $d_f^2$ denotes the square of the Euclidean distance between the received symbol and to the constellation point with $([\bar{u}],[\bar{u}])$, i.e., $$d_f^2 = \left\|\left(\Delta_u + 0.5\Delta_v, \frac{\Delta_v\sqrt{3}}{2}\right)\right\|^2$$

Where $\Delta_u = \bar{u} - |u|$ and $\Delta_v = \bar{v} - |v|$. Then the distance to the constellation point with $(|\bar{u}|\pm 1, |\bar{v}|)$ becomes $$d_1^2 = d_f^2 + 1 \pm (2\Delta_u + \Delta_v)$$

which does not require any multiplication. and for the other neighbors $(\bar{u}, \bar{v}\pm 1)$, to have $$d_2^2 = d_f^2 + 1 \pm (2\Delta_v + \Delta_u)$$

All other immediate neighbors could be computed similarly. In the above relations $d_f^2$ is a common term, therefore it may be ignored.

Moreover, the computation of $d_f^2$ s not necessary as it is a common term in the distances of all other neighbors and could be ignored in computing the nearest neighbor. Therefore, we end up with a multiplierless hard decoding.

Soft decoding is done similarly. Let $b_i$ denote i-th bit in the symbol. Define $\Sigma_i^1$ as the set of immediate neighbors to $(|\bar{u}|,|\bar{v}|)$ with $b_i=1$ in the corresponding codeword, and similarly $\Sigma_i^0$ a for $b_i=0$. Then the likelihood ratio (LLR) of $b_i$ is (assuming equiprobable codewords)

$$L(b_i) = \frac{\sum_{c \in \Sigma_i^2} p(r|c)}{\sum_{c \in \Sigma_i^0} p(r|c)}$$

For numerical tractability, the LLR is clipped if it is larger or smaller than predefined thresholds ±n. If all the surrounding neighbors have the same value for $b_i$ then $L(b_i)$ is set to ±n. depending on the value of $b_i$. For AWGN channels, the above likelihood could be simplified to $$L(b_i) \approx \min_{c \in \Sigma_i^0} \|r - c\|^2 - \min_{c \in \Sigma_i^1} \|r - c\|^2$$

Note that, the term $d_f^2$ is cancelled out and we also end up with a multiplierless soft decoding.

Any signal constellation for communication and/or coding is characterized by three parameters:
1. The constellation size M.
2. The position of each constellation point (in the complex plane).
3. The codeword associated with each constellation point.

Therefore, any constellation (regardless of its shape) could be represented by a lookup table of size M, whose entries are the position and the associated codeword for each constellation point. For example assume $M=2^q$, then the i-th entry in the lookup table has the location $s_i = x_i + jy_i$ as the position and the codeword $c_i = [b_{q-1}^i \ldots b_1^i b_0^i]$.

If a symbol $r = x + jy$ is received, then the objective of a hard decoder is to find the closest constellation point (in some sense), and output the corresponding codeword. In the simplest case, we use the Euclidean distance as the metric. In this case, we compute for each constellation point $$d_i \sqrt{(x - x_i)^2 + (y - y_i)^2}$$

and the decoded point is the one that corresponds to the minimum distance, i.e., $$\hat{i} = \mathrm{argmin}\{d_i\}$$

sand the decoded codeword becomes $c_i$.

Figure 4:
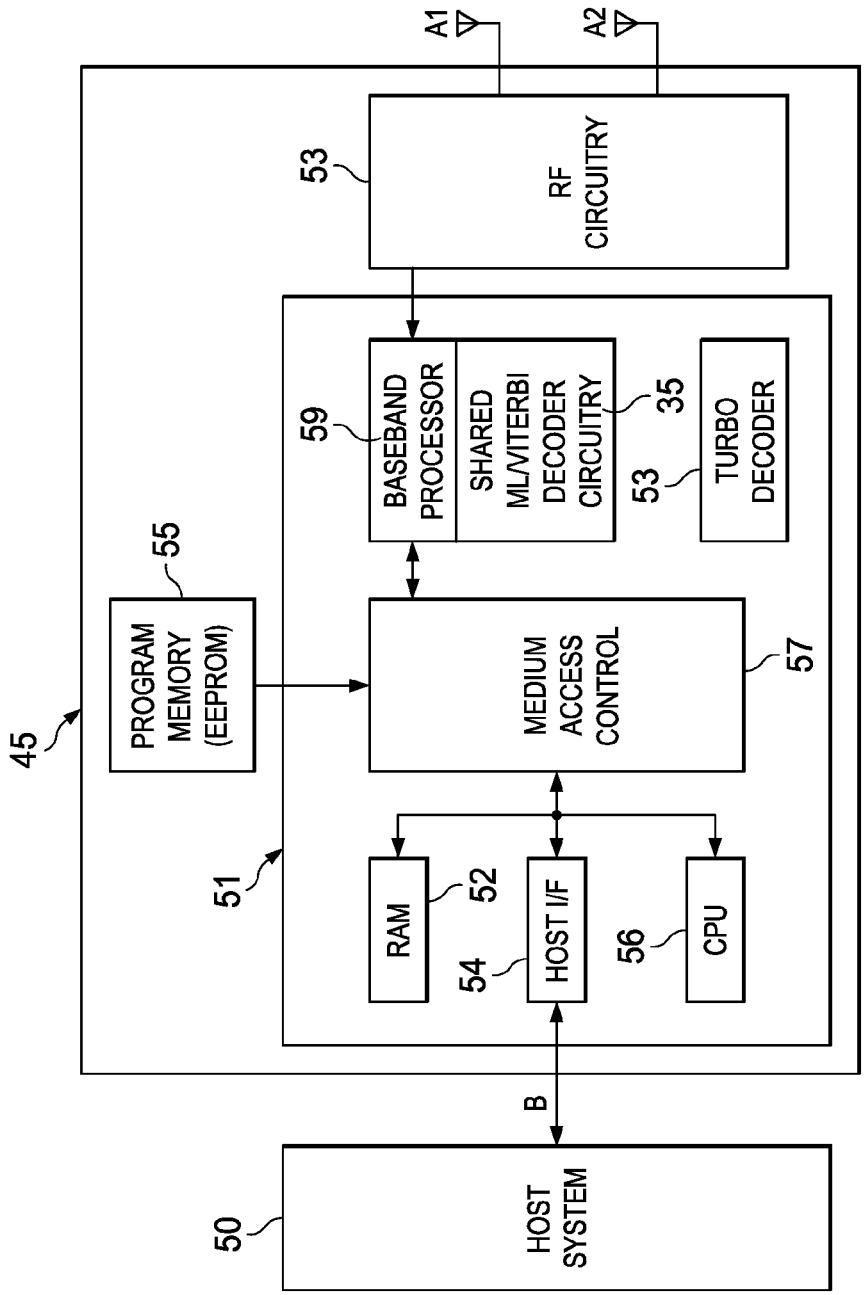
FIG. 4 is an electrical diagram, in block form, of the construction of an implementation of a receiver system.

FIG. 4 is illustrative of the construction of a transceiver system in which an embodiment of the invention may operate. Of course, it is contemplated that other architectures and approaches to realizing this transceiver system may also be used, as will be apparent to those skilled in the art having reference to this specification. Transceiver 45 according to this embodiment of the invention, illustrated in FIG. 4, includes the circuitry and functionality necessary and appropriate for carrying out the functions of receiver 20.

In FIG. 4, receiver also known as transceiver 45 is coupled to host system 50 by way of a corresponding bus B. Host system 50 corresponds to a personal computer, a laptop computer, or any sort of computing device capable of wireless broadband communications, in the context of a wireless local area network (LAN), wide area network (WAN), or "metro" area network (MAN); of course, the particulars of host system 50 will vary with the particular application.

Transceiver 45 in this example includes modem processor 51, which is bidirectionally coupled to bus B on one side, and to radio frequency (RF) circuitry 53 on its other side. RF circuitry 53, which may be realized by conventional RF circuitry known in the art, performs the analog demodulation, amplification, and filtering of RF signals received over the wireless channel and the analog modulation, amplification, and filtering of RF signals to be transmitted by transceiver 45 over the wireless channel, one or more antennae A1 and A2. RF circuitry 53 includes front end functions. The architecture of modem processor 51 into which this embodiment of the invention may be implemented follows that of a conventional single-chip media access controller (MAC) and a baseband processor. It is contemplated that the architecture of other transceiver installations, including for wireless broadband communications, whether on the network or client side, may follow a similar generic approach, as modified for the particular application location, as known in the art. This exemplary architecture includes embedded central processing unit (CPU) 56, for example realized as a reduced instruction set (RISC) processor, for managing high level control functions within modem processor 51. For example, embedded CPU 56 manages host interface 54 to directly support the appropriate physical interface to bus B and host system 50. Local RAM 52 is available to embedded CPU 56 and other functions in modem processor 51 for code execution and data buffering. Medium access controller (MAC) 57 and baseband processor 59 are also implemented within modem processor 51 according to the preferred embodiments of the invention, for generating the appropriate packets for wireless communication, and providing encryption, decryption, and wired equivalent privacy (WEP) functionality. It is contemplated that baseband processor 59 may be realized by way of a digital signal processor (DSP) "core", for example having the computational capacity of a modern DSP integrated circuit such as one of the TMS320C64x family of digital signal processors available from Texas Instruments Incorporated (Dallas Tex.). Program memory 55 is provided within transceiver 45, for example in the form of electrically erasable/programmable read-only memory (EEPROM), to store the sequences of operating instructions executable by modem processor 51, including control instructions for carrying out the decoding sequences according to the preferred embodiment of the invention. Also included within transceiver 45, in the form of a wireless adapter, are other typical support circuitry and functions that are not shown, but that are useful in connection with the particular operation of transceiver 45.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of processing communications signals, comprising:

receiving, at a receiver, a constellation which has a plurality of unused constellation points;

using a plurality of lookup tables for indicating whether a particular constellation point is used and a corresponding codeword for the used constellation point;

indexing the lookup tables using an integer u and an integer v;

computing an initial estimate of the integer u and the integer v giving an integer $\bar{u}$ and an integer $\bar{v}$ comprising:

$$\bar{v} = 2(y - y_0)/\sqrt{3}$$
$$\bar{u} = x - x_0 - (y - y_0)/\sqrt{3}$$

a normalized received symbol is $$\frac{r}{\sqrt{E_g}} = (x, y),$$

where (x,y) are the coordinates of the received symbol r and where (x0,y0) is a fixed perturbation for symbol r0 that could be used to minimize the maximum energy Eg;
   computing a modified Euclidean distance to an immediate constellation point neighbor that corresponds to the upper and lower integer of $\bar{u}$ and $\bar{u}$; and from the distance to the immediate constellation point neighbor, computing a log-likelihood ratio value.

2. A method of processing communications signals, comprising:
   receiving, at a receiver, a constellation which has a plurality of unused constellation points;
   using a plurality of lookup tables for indicating whether a particular constellation point is used and a corresponding codeword for the used constellation point;
   indexing the lookup tables using an integer u and an integer v;
   finding an initial estimate of the integer u and the integer v giving an upper integer $\bar{u}$ and a lower integer $\bar{v}$;
   computing a modified Euclidean distance to an immediate constellation point neighbor that corresponds to the upper and lower integers of $\bar{u}$ and $\bar{u}$; and from the distance to the immediate constellation point neighbor, computing a log-likelihood ratio value; and
   computing an adjusted distance d to the constellation point neighbors of $(\bar{u},\bar{v})$ that are around $(\lfloor\bar{u}\rfloor,\lfloor\bar{v}\rfloor)$ to represent a biggest integer smaller than each of a plurality of coordinates $$d(\lfloor\bar{u}\rfloor, \lfloor\bar{v}\rfloor) = 0$$
$$d(\lfloor\bar{u}\rfloor \pm 1, \lfloor\bar{v}\rfloor) = 1 \pm (2\Delta_u + \Delta_v),$$
$$d(\lfloor\bar{u}\rfloor, \lfloor\bar{v}\rfloor \pm 1) = 1 \pm (2\Delta_v + \Delta_u),$$

where small change in $u$ is $$\Delta_u = \bar{u} - \lfloor\bar{u}\rfloor$$

and small change in $v$ is $$\Delta_v = \bar{v} - \lfloor\bar{v}\rfloor.$$

3. The method of claim 2, wherein the distances are used in computing a closest neighbor for hard decoding or the log-likelihood ration for soft decoding.

4. A method of processing communications signals, comprising:
   receiving, at a receiver, a constellation which has unused constellation points;
   using a plurality of lookup tables for indicating whether a particular constellation point is used and a corresponding codeword for the used constellation point;
   indexing the lookup tables using the two integers u and v;
   finding an initial estimate of an integer u and an integer v giving an upper integer $\bar{u}$ and a lower integer $\bar{u}$;
   computing a modified Euclidean distance to an immediate constellation point neighbor that corresponds to the upper and lower integers of $\bar{u}$ and $\bar{u}$;
   from the distance to the immediate constellation point neighbor, computing a log-likelihood ratio value;
   for the i-th bit $b_i$ in the symbol r, defining for $\Sigma_i^1$ for $b_i$ the set of immediate neighbors with $b_i=1$ in the corresponding codeword c;
   similarly defining $\Sigma_i^0$ for $b_i=0$; and
   computing a log-likelihood ratio (LLR) of $b_i$ by using:

$$L(b_i) = \frac{\sum_{c \in \Sigma_i^1} \rho(r|c)}{\sum_{c \in \Sigma_i^0} \rho(r|c)}$$

where $\rho(r|c)$ is a function of the distance above.

5. The method of claim 4, further comprising:
   clipping the LLR if it is larger or smaller than a predefined threshold($\pm\eta$); and
   setting $L(b_i)$ to $\pm\eta$ depending on the value of $b_i$.

6. The method of claim 5, further comprising:
   if none of the immediate neighbors have a codeword that correspond to bi=1, setting L(bi)=–$\eta$,
   if none of the immediate neighbors have a codeword that correspond to bi=0, setting L(bi)=+$\eta$.

7. The method of claim 5, further comprising:
   simplifying the LLR to $$L(b_i) = \min_{c \in \Sigma_i^0} \|r - c\|^2 - \min_{c \in \Sigma_i^1} \|r - c\|^2$$

for Additive White Gaussian Noise (AWGN) channels.

8. A device comprising:
   a receiver;
   a processor, coupled to the receiver;
   a computer-readable medium including computer-readable instructions stored therein that, upon execution by the processor, perform operations comprising:
      receiving a constellation which has unused constellation points;
      using a plurality of lookup tables for indicating whether a particular constellation point is used and a corresponding codeword for the used constellation point;
      indexing the lookup tables using an integer u and an integer v;
      finding an initial estimate of u and v giving an upper integer $\bar{u}$ and a lower integer $\bar{v}$ by
   computing the initial estimate of u and v comprising:

$$\bar{v} = 2(y - y_0)/\sqrt{3}$$
$$\bar{u} = x - x_0 - (y - y_0)/\sqrt{3}$$

a normalized received symbol is $$\frac{r}{\sqrt{E_g}} = (x, y),$$

where (x,y) are coordinates for the received symbol r and where (x0,y0) is a fixed perturbation for symbol r0 that could be used to minimize the maximum energy Eg;
   computing a modified Euclidean distance to an immediate constellation point neighbor that corresponds to the upper and lower integers of $\bar{u}$ and $\bar{v}$; and from the distance to the immediate constellation point neighbor, computing a log-likelihood ratio value.

9. A device comprising:
a receiver;
a processor, coupled to the receiver;
a computer-readable medium including computer-readable instructions stored therein that, upon execution by the processor, perform operations comprising:
receiving a constellation which has a plurality of unused constellation points;
using a plurality of lookup tables for indicating whether a particular constellation point is used and a corresponding codeword for the used constellation point;
indexing the lookup tables using an integer u and an integer v;
finding an initial estimate of u and v giving an upper integer $\bar{u}$ and a lower integer $\bar{v}$;
computing a modified Euclidean distance to the immediate constellation point neighbor that corresponds to the upper and lower integers of $\bar{u}$ and $\bar{v}$;
from the distance to the immediate constellation point neighbor, computing a log-likelihood ratio value; and
computing an adjusted Euclidean distance d to the constellation point neighbors of $(\bar{u},\bar{v})$ that are around $(\lfloor\bar{u}\rfloor,\lfloor\bar{v}\rfloor)$ to represent a biggest integer smaller than each of a plurality of coordinates $$d(\lfloor\bar{u}\rfloor, \lfloor\bar{v}\rfloor) = 0$$

$$d(\lfloor\bar{u}\rfloor \pm 1, \lfloor\bar{v}\rfloor) = 1 \pm (2\Delta_u + \Delta_v),$$

$$d(\lfloor\bar{u}\rfloor, \lfloor\bar{v}\rfloor \pm 1) = 1 \pm (2\Delta_v + \Delta_u),$$

where small change in $u$ is $$\Delta_u = \bar{u} - \lfloor\bar{u}\rfloor$$

and small change in $v$ is $$\Delta_v = \bar{v} - \lfloor\bar{v}\rfloor.$$

where small change in u is $\Delta_u = \bar{u} - [\bar{u}]$ and small change in v is $\Delta_v = \bar{v} - [\bar{v}]$.

10. The device of claim 9, wherein the distances are used to compute the closest neighbor for hard decoding or the log-likelihood ration for soft decoding.

11. A device comprising:
a receiver;
a processor, coupled to the receiver;
a computer-readable medium including computer-readable instructions stored therein that, upon execution by the processor, perform operations comprising:
receiving a constellation which has a plurality of unused constellation points;
using a plurality of lookup tables for indicating whether a particular constellation point is used wherein unused constellation points are flagged and wherein a plurality of entries of the tables are the codewords of the constellation points;
computing an Euclidean distance to an immediate neighbor resulting in the immediate upper and lower integers for $\bar{u}$ and $\bar{v}$;
selecting the upper or lower integer that corresponds to the smallest distance, if it is used in the constellation; and
for the i-th bit $b_i$ in a symbol r, defining $\Sigma_i^1$ $b_i$ the set of immediate neighbors with $b_i=1$ in a corresponding codeword c;

similarly define $\Sigma_i^0$ for $b_i=0$;
computing a log-likelihood ratio (LLR) of $b_i$ by using:

$$L(b_i) = \frac{\sum_{c \in \Sigma_i^1} \rho(r|c)}{\sum_{c \in \Sigma_i^0} \rho(r|c)}$$

where $\rho(r|c)$ is a function of the distance in claim 9.

12. The device of claim 11, further comprising:
clipping the LLR if it is larger or smaller than a predefined threshold ($\pm\eta$); and
setting $L(b_i)$ to $\pm\eta$ depending on the value of $b_i$.

13. The device of claim 12, further comprising:
simplifying the LLR to $$L(b_i) \approx \min_{c \in \Sigma_i^0} \|r - c\|^2 - \min_{c \in \Sigma_i^1} \|r - c\|^2$$

for Additive White Gaussian Noise (AWGN) channels.

14. A computer program product of computer-readable instructions, tangibly embodied on a non-transitory computer-readable medium and executable by a digital data processor to perform actions directed toward transmitting a signal, the computer-readable instructions configured to cause a device to:
receive a constellation which has a plurality of unused constellation points;
use a plurality of lookup tables for indicating whether a particular constellation point is used and a corresponding codeword c for the used constellation point;
index the lookup tables using an integer u and an integer v;
find an initial estimate of the integers u and v giving an upper integer $\bar{u}$ and a lower integer $\bar{v}$ by computing the initial estimate of u and v comprising:

$$\bar{v} = 2(y - y_0)/\sqrt{3}$$

$$\bar{u} = x - x_0 - (y - y_0)/\sqrt{3}$$

a normalized received symbol is $$\frac{r}{\sqrt{E_g}} = (x, y),$$

where (x,y) are coordinates for the received symbol r and where $(x_0,y_0)$ is a fixed perturbation for symbol $r_0$ that could be used to minimize the maximum energy $E_g$;
compute the Euclidean distance to an immediate neighbor resulting in the immediate upper and lower integers for $\bar{u}$ and $\bar{v}$; and
select the upper or lower integer that corresponds to the smallest distance, if it is used in the constellation.

15. The computer program product of claim 14,
further computes the Euclidean distance d to the constellation point neighbors of $(\bar{u},\bar{v})$ that are around $(\lfloor\bar{u}\rfloor,\lfloor\bar{v}\rfloor)$ to represent a biggest integer smaller than each of a plurality of coordinates $$d(\lfloor \bar{u} \rfloor, \lfloor \bar{v} \rfloor) = 0$$

$$d(\lfloor \bar{u} \rfloor \pm 1, \lfloor \bar{v} \rfloor) = 1 \pm (2\Delta_u + \Delta_v),$$

$$d(\lfloor \bar{u} \rfloor, \lfloor \bar{v} \rfloor \pm 1) = 1 \pm (2\Delta_v + \Delta_u),$$

where small change in $u$ is $$\Delta_u = \bar{u} - \lfloor \bar{u} \rfloor$$

and small change in $v$ is $$\Delta_v = \bar{v} - \lfloor \bar{v} \rfloor.$$

16. A computer program product of computer-readable instructions, tangibly embodied on a non-transitory computer-readable medium and executable by a digital data processor coupled to a transceiver to perform actions directed toward transmitting a signal, the computer-readable instructions configured to cause a device to, upon execution by the processor, perform operations comprising:
   receiving, by the transceiver, a constellation which has unused constellation points;
   using a plurality of lookup tables for indicating whether a particular constellation point is used wherein unused constellation points are flagged and wherein a plurality of entries of the tables are the codewords of the constellation points;
   computing a Euclidean distance to the immediate neighbors resulting from the immediate upper and lower integers for u and v giving an upper integer $\bar{u}$ and a lower integer $\bar{v}$;
   selecting the upper or lower integer that corresponds to the smallest distance, if it is used in the constellation;
   for the i-th bit $b_i$ in the symbol, defining $\Sigma_i^1$ for $b_i$ the set of immediate neighbors with $b_i=1$ in the corresponding codeword;
   similarly define $\Sigma_i^0$ for $b_i=0$; and
   computing a log-likelihood ratio (LLR) of $b_i$ by using:

$$L(b_i) = \frac{\sum_{c \in \Sigma_i^1} \rho(r|c)}{\sum_{c \in \Sigma_i^0} \rho(r|c)}$$

where $\rho(r|c)$ is a function of the distance in claim 15.

17. The computer program product of claim 16, further comprising:
   clipping the LLR if it is larger or smaller than a predefined threshold ($\pm \eta$); and
   setting $L(b_i)$ to $\pm \eta$ depending on the value of $b_i$.

18. The computer program product of claim 16, further comprising:
   simplifying the LLR to $$L(b_i) \approx \min_{c \in \Sigma_i^0} \|r - c\|^2 - \min_{c \in \Sigma_i^1} \|r - c\|^2$$

for Additive White Gaussian Noise (AWGN) channels.

* * * * *